H. J. GAGE.
MITER SAW TABLE.
APPLICATION FILED MAY 5, 1913.

1,104,982.

Patented July 28, 1914.
3 SHEETS—SHEET 1.

Witnesses
Clarence M. Smith
J. B. Webster

Inventor
Harold J. Gage
By Sonny J. Webster
Attorney

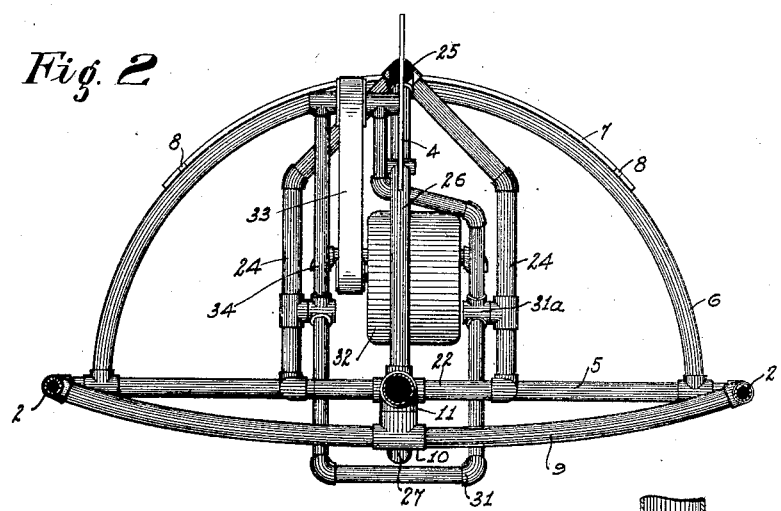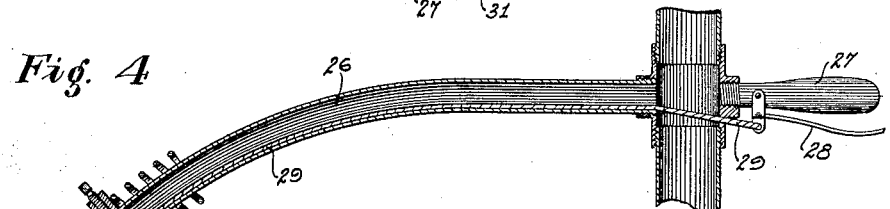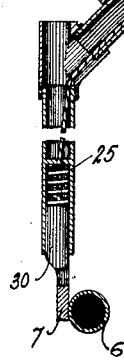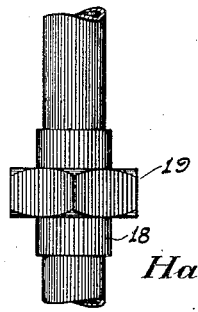

H. J. GAGE.
MITER SAW TABLE.
APPLICATION FILED MAY 5, 1913.

1,104,982.

Patented July 28, 1914.
3 SHEETS—SHEET 3.

Witnesses
Clarence M. Smith
J. B. Webster

Inventor
Harold J. Gage
By Attorney

UNITED STATES PATENT OFFICE.

HAROLD J. GAGE, OF STOCKTON, CALIFORNIA, ASSIGNOR OF ONE-HALF TO HORACE O. CAMM, OF STOCKTON, CALIFORNIA.

MITER-SAW TABLE.

1,104,982. Specification of Letters Patent. Patented July 28, 1914.

Application filed May 5, 1913. Serial No. 765,503.

*To all whom it may concern:*

Be it known that I, HAROLD J. GAGE, a citizen of the United States, residing at Stockton, in the county of San Joaquin, State of California, United States of America, have invented certain new and useful Improvements in Miter-Saw Tables; and I do declare the following to be a clear, full, and exact description of the same, such as will enable others skilled in the art to which it appertains to make and use the same, reference being had to the accompanying drawings, and to the characters of reference marked thereon, which form a part of this application.

This invention relates to improvements in saw mechanisms and particularly to a saw used for cutting miters, rabbets and also for cross-cut and rip sawing, the object of the invention being to produce an adjustable saw whereby the saw may be readily moved to the various positions required to cut the miters, etc., at the different angles required.

While the invention primarily relates to a miter-saw, as above mentioned, still in practice as will be found out the same mechanism may be used for various other sawing operations.

A further object of the invention is to produce a simple and inexpensive device and yet one which will be exceedingly effective for the purposes for which it is designed.

These objects, I accomplish by means of such structure and relative arrangement of the parts as will fully appear by a perusal of the following specification and claims.

On the drawings similar characters of reference indicate corresponding parts in the several views.

Figure 1:
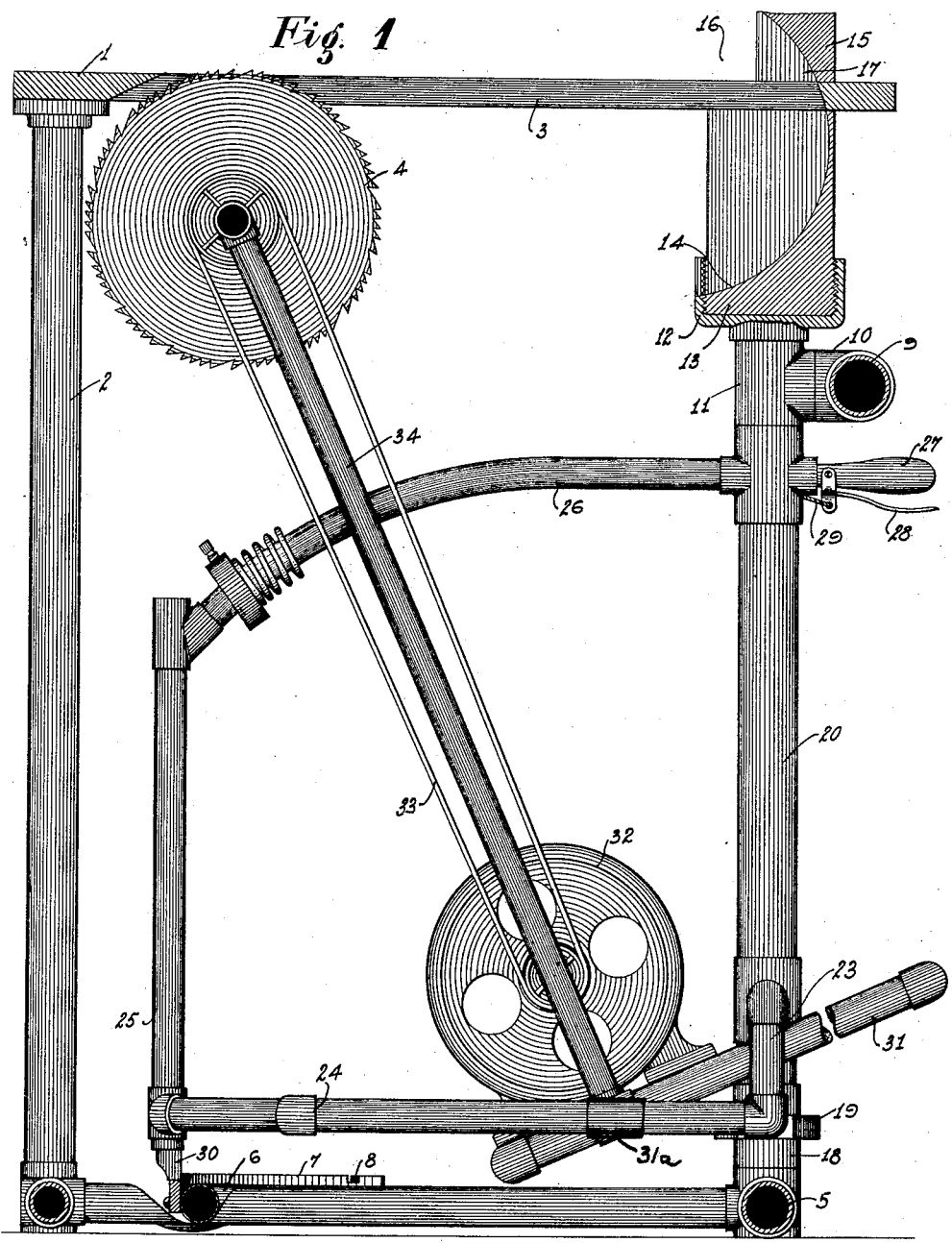
Figure 3:
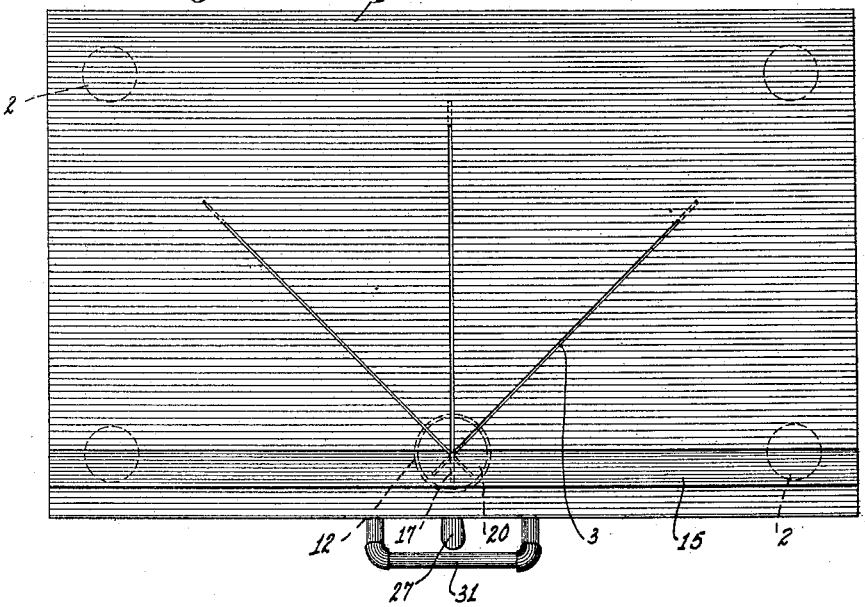
Figure 6:
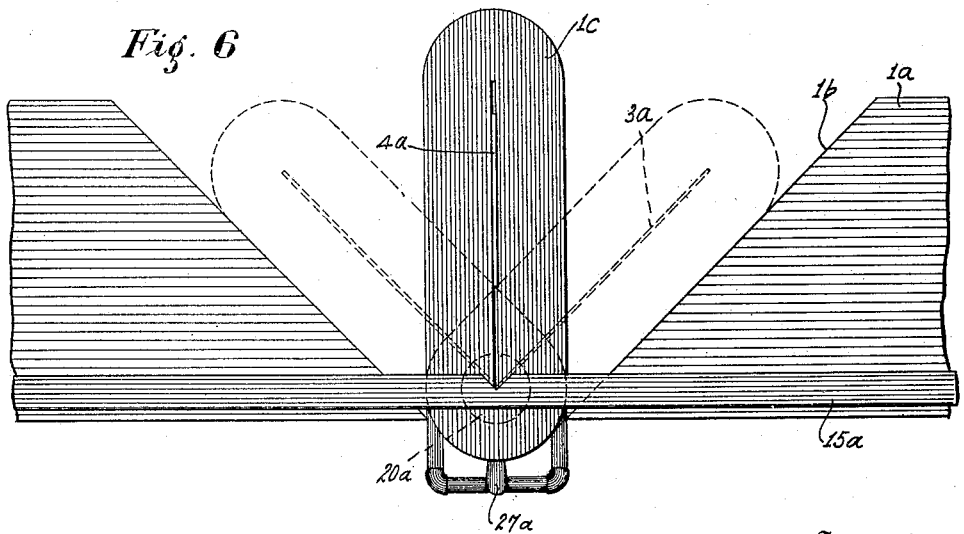

Figure 1 is a vertical cross section of my improved miter table showing the adjustable saw in operative position thereon. Fig. 2 is a top plan view of the saw and its operative mechanism with the table removed. Fig. 3 is a top plan view of the table. Fig. 4 is a sectional view of a part of the frame work showing the means for releasing and locking the saw from and in the various positions which it is to assume. Fig. 5 is a side elevation, partly in section, showing the adjustable turning rod by which the saw mechanism is shifted to the various positions desired. Fig. 6 is a top plan view showing a modified form from the other structure in which the table is capable of being shifted as well as the saw mechanism.

Referring now more particularly to the characters of reference on the drawings, the numeral 1 designates the table suitably supported on vertical supports 2 and provided with slots 3 adapted to receive the saw 4 at the various angles desired to perform the sawing operation.

The numeral 5 designates a cross member projecting between two of the members 2 on one side of the table and which is provided with a semi-circular member 6 projecting under the table, which member 6 is provided with a guide member 7 having notches 8 at predetermined points to determine the various positions to which the saw may be moved. The numeral 9 designates another member connected to the same members 2 to which the member 5 is connected but at the upper end thereof and said member 9 curves slightly outwardly and is provided with a T-member 10 carrying a vertical sleeve 11. Secured to the upper end of said sleeve is a retaining member 12 holding a guide 13 provided with circular slots 14 to permit the saw to move therein. This guide 13 projects along the under side of the table 1 and said table is provided on its upper surface with another guide 15 against which the wood to be cut is disposed as at 16, said guide 15 having curved slots 17, the slots 17, 3 and 14 being of course in register with each other to permit of the operation of the saw.

Secured centrally on the member 5 is a vertical member 18 provided with a union 19 turnable in which is a vertical member 20, the upper end of said vertical member 20 being turnable in the sleeve 11 as at 21. Said member 20 has a pair of outwardly projecting branches 22 having downwardly projecting members 23 carrying a rectangular frame 24. Said rectangular member carries in its outer end a vertical tubular member 25 which extends upwardly and is provided with a curving branch 26 connected with the vertical member 20. On said vertical member 20 is a handle member 27 having a lever 28, there being a cable 29 connected with said lever 28 and projecting through the tubular member 25—26. The lower end of said cable 29 is connected with a pin 30 adapted to engage one of the notches 8 in the guide 7. Hence, by operating the lever 28 to pull on the cable 29, the pin 30 may be released from one of the notches 8 and then by the operation of the handle 27 the member 20 may be turned on its pivotal points 22—23—24. The saw mechanism is mounted on said frame 22—23—24 in the following manner, namely: A substantially rectangular frame 31 is pivotally mounted on the frame 24 as at 31ª and the motor 32 of the saw is mounted on said frame 31 and drives a belt 33 which drives the saw 4, said saw being held on upwardly projecting supporting members 34. The said saw and its carrying frame are normally in position to leave said saw out of any one of the slots 3 and in this position the frame 31 impinges against the members 22. When it is desired to operate the saw, the handle 27 is used in the manner set forth to move the frame 22—23—24 to such a position as will bring the saw into whichever one of the slots 3 is to be used and then the pin 30 is allowed to project into the corresponding slot 8 which holds the mechanism locked in operative position and then the motor 32 is operated by suitable electrical apparatus (not described) and the operator then places the material 16 against the guide 15 alining the part to be cut with the slots 3, 14 and 17. The operator then places his foot upon the member 31 causing it to move on its pivotal points 31ª and carrying the saw 4 into one of the slots 3 where it performs the cutting operation and then by releasing the member 31, the weight of the motor causes the same to drop back again out of the slot 3 when it is ready to be shifted to any of the other various points from which it is to be operated, which operation would be performed by means of the revoluble frame, as described.

Fig. 6 shows a modified form of the device in which the numeral 1ª designates the main supporting table which is provided with a V-shaped incision 1ᵇ and with a guide 15ª. In this device, the table 1ᵇ and its connected parts are in stationary position but on the vertical supporting member 20ª corresponding to the member 20 in the preferred form is a turnable table 1ᶜ provided with slots 3ª and by the operation of the handle 27ª this table and the saw mechanism may be shifted to the various positions required as shown by dotted lines and then the saw operating mechanism would be the same as shown in the preferred form, the principle being the same in both.

From the foregoing description it will readily appear that I have produced a miter-saw which is easily and quickly adjustable to various positions to make the different angle cuts desired and also one which can be used for rabbeting, cross-cut and rip sawing if such is desired.

As before stated, the invention provides the adjustable saw rather than the adjustable guides and renders the device therefore more easily and quickly handled and permits ready, effective and accurate work.

I claim—

1. A device of the character described comprising the combination with a supporting frame having a slotted table thereon, of a tubular member, members on said supporting frame on which said tubular member is turnable, a pair of branches on said tubular member near its lower end, a projecting frame carried by said branches, a frame pivotally mounted on said projecting frame and projecting under said pair of branches, and a saw mechanism mounted on said pivotally mounted frame and having a saw adapted to engage the slots in said table, as described.

2. A device of the character described comprising the combination with a supporting frame carrying a table provided with slots, a member turnable on said frame, a pair of branches on the lower end of said turnable member, a projecting frame carried by said branches, an adjustable catch on said frame carried by said branches, a guide member on said supporting frame having notches adapted to be engaged by said catch and a saw mechanism pivotally mounted on said frame on said branches and carrying a saw adapted to engage said slots in said table, as described.

In testimony whereof I affix my signature in presence of two witnesses.

HAROLD J. GAGE.

Witnesses:
JOSHUA B. WEBSTER,
CLARENCE M. SMITH.